United States Patent [19]
Cooke et al.

[11] Patent Number: 5,875,030
[45] Date of Patent: Feb. 23, 1999

[54] METHOD AND APPARATUS FOR COHERENT ELECTROMAGNETIC FIELD IMAGING THROUGH FOURIER TRANSFORM HETERODYNE

[75] Inventors: Bradly J. Cooke, Jemez Springs, N. Mex.; Amy E. Galbraith, Tucson, Ariz.

[73] Assignee: The Regents of the University of California, Los Alamos, N. Mex.

[21] Appl. No.: 867,153

[22] Filed: May 30, 1997

[51] Int. Cl.[6] .................................................. G01B 9/02
[52] U.S. Cl. ............................................................ 356/349
[58] Field of Search ................................... 356/349, 351, 356/359, 360; 382/280

[56] References Cited

U.S. PATENT DOCUMENTS

| | | | |
|---|---|---|---|
| 4,417,813 | 11/1983 | Bartholomew | 356/349 |
| 4,563,091 | 1/1986 | Dandliker | 356/349 |
| 5,428,447 | 6/1995 | Toida | 356/349 |

*Primary Examiner*—Samuel A. Turner
*Attorney, Agent, or Firm*—Milton D. Wyrick

[57] ABSTRACT

Apparatus and method for imaging objects through the inverse transformation of a set of Fourier coefficients measured by a detector. The Fourier coefficients are generated by heterodyning the electromagnetic field reflected from an object with a reference electromagnetic field that has had the transverse phase modulated with a Fourier basis set. Doppler imaging of objects is accomplished through temporal frequency filtering of the Fourier coefficients at a plurality of heterodyne intermediate frequencies.

12 Claims, 3 Drawing Sheets

METHOD AND APPARATUS FOR COHERENT ELECTROMAGNETIC FIELD IMAGING THROUGH FOURIER TRANSFORM HETERODYNE

FIELD OF THE INVENTION

The present invention generally relates to imaging techniques, and, more specifically, to the use of Fourier transform heterodyning for imaging of both the phase and magnitude of coherent or quasi-coherent optical or microwave fields reflected from an object. This invention was made with Government support under Contract No. W-7405-ENG-36 awarded by the U.S. Department of Energy. The Government has certain rights in the invention.

The use of imaging techniques has exploded within the recent past, so that the public now has access to images of natural phenomena such as rain, snow and clouds. In general, the imaging of remote objects and phenomena is becoming vitally important both for civilian and military objectives. For example, the current systems used at airports to detect and warn of dangerous wind shear problems are not totally reliable. An accurate and reliable system to detect wind shear would be of inestimable value in preventing aircraft mishaps.

In the military sector, the ability to image remote objects through clutter such as fog, smoke, and foliage while mitigating the detrimental affects of turbulence and speckle is vitally important to a commander planning a campaign and to the individual soldier in determining the threat posed to him. In the industrial sector, the imaging of objects such as precision parts, electronic components and optical components for quality control and other purposes is of rapidly growing importance.

In the past, electronic systems have been the primary system for providing an imaging capability. However, optical data processing systems have several advantages over these conventional electronic systems. Among these advantages are increased speed of producing an image, enhanced dynamic range, improved resolution and a higher degree of reliability.

Of the several imaging systems currently available, most suffer from a failure to provide sufficient information on remote objects to provide adequate means for identification. Additionally, many imaging systems suffer from a lack of efficiency and durability.

In order to design a highly accurate optical data processing system, it is necessary to determine quantitatively the manner in which an optical component modulates, in both amplitude and phase, a coherent beam of light transmitted or reflected by the object to be imaged. The present invention accomplishes this, and presents an RF/optical imaging system which features a high detection signal to noise ratio and high resolution imaging, and succeeds in preserving both the magnitude and phase of the image.

It is therefore an object of the present invention to provide apparatus for the imaging of remote objects and phenomena.

It is another object of the present invention to provide apparatus for imaging that is capable of measuring the magnitude, phase and velocity of signals from the image.

It is yet another object of the present invention to provide apparatus for imaging remote objects and phenomena which provides a high signal to noise ratio and high resolution images.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, apparatus for imaging objects comprises a source of coherent electromagnetic energy transmitting the coherent electromagnetic energy to the object to be imaged. A receiver detects electromagnetic energy reflected from the object to be imaged for imaging magnitude and phase of the reflected electromagnetic energy and outputting an image of the object to be imaged.

In another aspect of the present invention and in accordance with its objects and principles apparatus for imaging an object from which a coherent electromagnetic field has been reflected comprises first mirror means for receiving and focusing the coherent electromagnetic field reflected from the object. Local oscillator means produce a reference electromagnetic field, and spatial modulator means receive the reference electromagnetic field for producing a modulated reference electromagnetic field. Second mirror means reflect the modulated reference electromagnetic field into the focused coherent electromagnetic field reflected from the object producing a summation of the modulated reference electromagnetic field and the focused coherent electromagnetic field. Detector means receive the summed modulated reference electromagnetic field and focused coherent electromagnetic field for determining a heterodyne intermediate frequency defining a phase and magnitude and outputting of the heterodyne intermediate frequency. Phase-locked detection means receive the heterodyne intermediate frequency for locking and detecting the phase and magnitude of the heterodyne intermediate frequency and producing Fourier coefficients representing an image of the object to be imaged.

In a still further aspect of the present invention and in accordance with its objects and principles apparatus for imaging objects comprises laser means for producing a coherent light beam with beamsplitting means receiving the coherent light beam for directing the coherent light beam onto a first path and onto a second path. Spatial low pass filter means is located in the first path for spatially filtering coherent light for transverse phase and magnitude. Modulating means are in the first path for spatially modulating the spatially filtered coherent light beam with an electrical signal. An object to be imaged is located in the second path through which the coherent light beam passes. Beam combining means combines the modulated coherent light from the first path with coherent light affected by the object in the second path. Detector means receive the combined coherent light from the first and second paths, producing a spatial heterodyne, for outputting an electrical signal proportional to the spatial heterodyne of the combined coherent light. Analyzing means receives the electrical signal for determining magnitude and phase of the electrical signal and outputting a signal proportional to the magnitude and phase of the electrical signal. Computer means receives the signal proportional to the magnitude and phase of the electrical signal for performing an inverse Fourier transform on the signal and producing an image of the object.

In yet another aspect of the present invention and in accordance with its objects and principles a method of imaging an object comprises the steps of illuminating the object with an electromagnetic field; collecting an electromagnetic field reflected from said object; producing a reference electromagnetic field having a transverse phase; spatially modulating the transverse phase of the reference electromagnetic field with a Fourier or other valid basis set; heterodyning the electromagnetic field reflected from the object with the modulated reference electromagnetic field producing a heterodyne intermediate frequency; detecting the phase and magnitude of the heterodyne intermediate frequency and generating Fourier coefficients representing an image of the object.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention allows imaging of remote objects and phenomenom with a high degree of resolution and a high signal to noise ratio. It accomplishes this through application of Fourier transform principles. The invention can be understood most easily through reference to the drawings.

Figure 1:
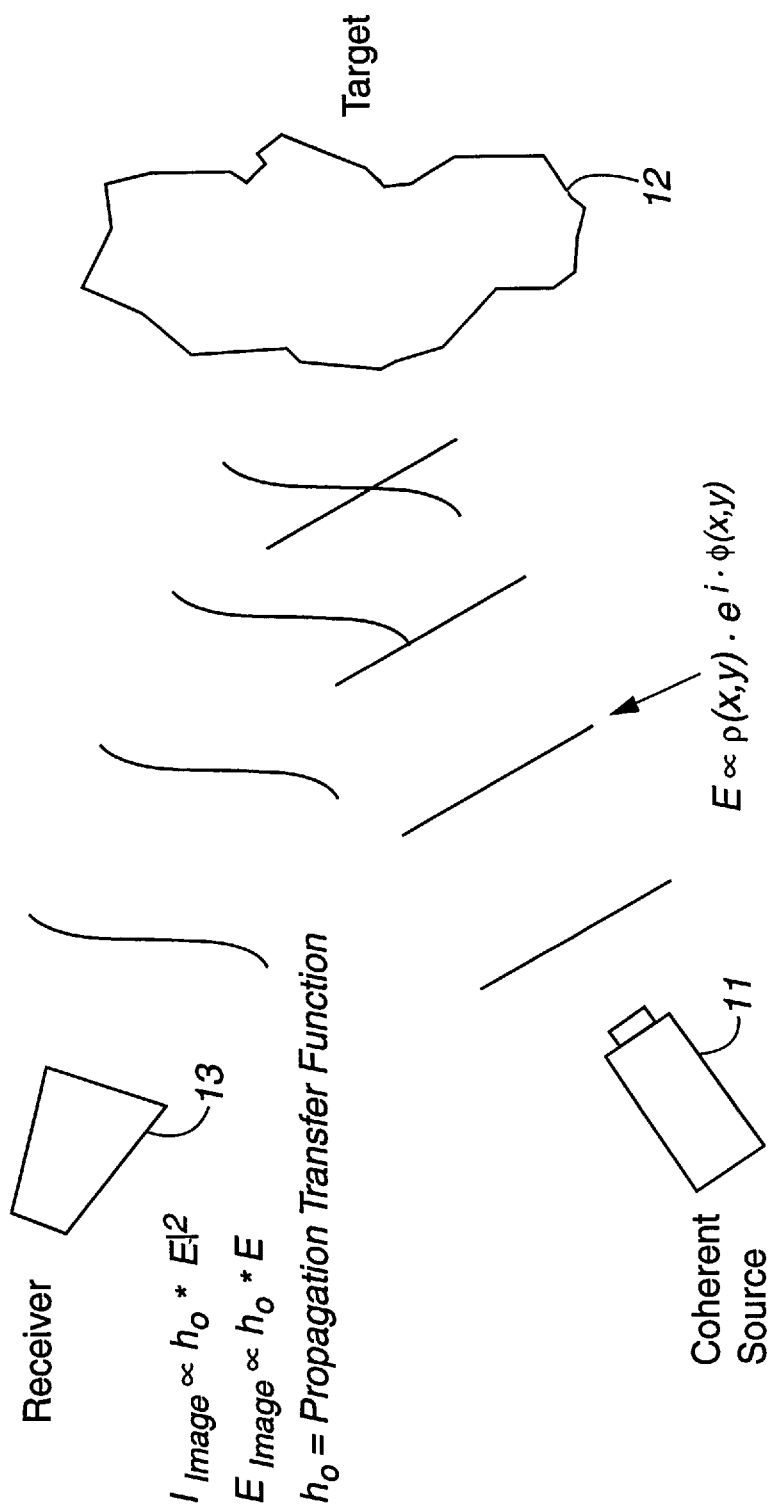
FIG. 1 is schematical drawing illustrating the basic structure of the present invention.

Turning now to FIG. 1, there can be seen one embodiment of the invention. Here, coherent source 11, either a RF or light source, uniformly illuminates object 12, which in this embodiment is a non-light-absorbing object. Light from coherent source 11 is reflected from and modified by the surface of object 12, and is captured by detector 13, where both the magnitude and phase of the electromagnetic field reflected from object 12 is imaged. This is the basic arrangement for practice of the invention for the coherent/quasi-coherent imaging of objects.

Figure 2:
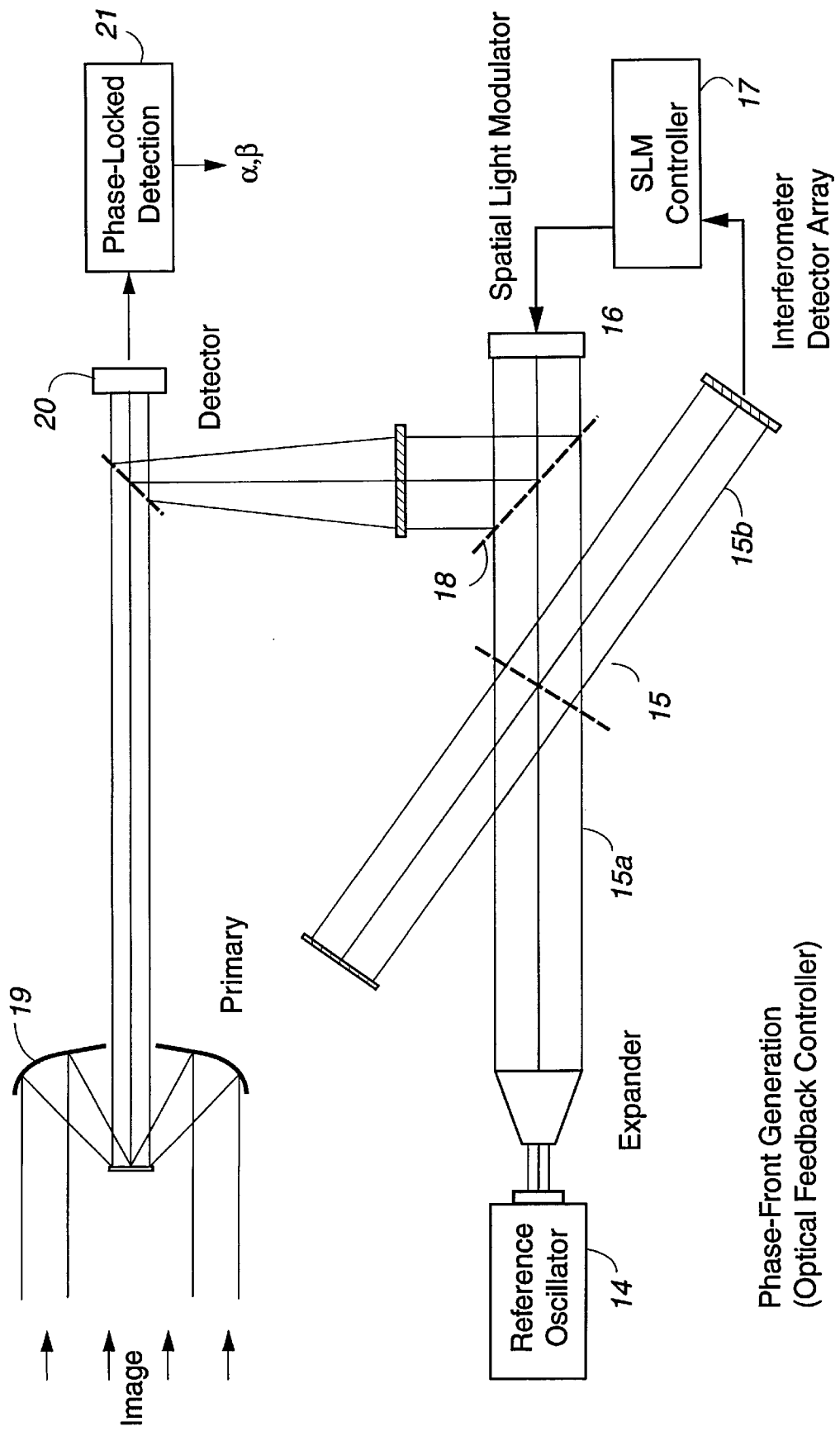
FIG. 2 is a schematical drawing of a practical embodiment of the invention for imaging objects utilizing a programmable mirror for modulation.

In FIG. 2, a schematical drawing of another embodiment of the present invention is illustrated which has a resolution of M×N for processing the electromagnetic field reflected from object 12 (FIG. 1). Here, the spatial modes used by the present invention are generated by feeding the output of reference local oscillator 14 into interferometer 15. Leg 15a of interferometer 15 is terminated in (2–4)×M×N pixel programmable spatial light modulator (SLM) 16, although it is possible to use any programmable mirror or modulator with the present invention. Each pixel of SLM 16 is programmable within a spatial phase modulation range of ±λ for any given wavelength.

As SLM 16 scans through the 2×M×N series of pre-programmed phase modes, interferometer 15, at leg 15b detects the phase front interference distribution and provides corrective feedback to SLM controller 17. The phase mode of an image is picked off leg 15a by mirror 18 and heterodyned with light from an object (not shown) which has been collected by primary collector 19 and received at detector 20.

Detection of the Fourier coefficients of the image is accomplished by phase-locked circuitry 21 phase locking onto the heterodyned intermediate frequency (I.F.), alternating current (AC) signal, and measuring the relative phase and magnitude ($\alpha$ and $\beta$) of the intermediate frequency signal for each phase mode. After the entire 2×M×N array of Fourier coefficients has been assembled, the object image is obtained through the inverse Fourier transform of the Fourier coefficients.

The Fourier Transform Heterodyne process of the present invention can be extended to Doppler or velocity-field imaging by temporal frequency filtering of the output of detector 20. A bank consisting of a quantity, "L," of temporal filters at phase-lock circuitry 21 will resolve an image into 2×L×M×N Fourier coefficients generating a L×M×N velocity field data cube after inverse Fourier transforming. Each slice of the L×M×N data cube corresponds to an image composed exclusively of the Doppler-shifted velocity components falling within a given frequency band or range.

In FIG. 2, detector 20 is illustrated as a single element detector. However, it should be understood that detector 20 as well could be an array of individual detectors, each having its own phase-locked circuitry 21. This type of detector 20 would have the ability to partition the image, providing a system trade-off capability between image resolution and hardware synthesis. In furtherance of this embodiment of the invention, the associated algorithm easily can be extended to a multi-spectral imager, with reference oscillator 14 tunable over a band of RF or optical wavelengths.

The efficacious operation of the present invention begins with an understanding of the modified Poynting relation, as shown in Equation 10, where the dependence of the current induced in detector 20 (FIG. 2), I, the quantum efficiency of detector 20, $\eta$, and signal and local oscillator 14 electromagnetic fields over the surface, s, of detector 20 can be represented by:

$$I = k \int\!\!\int_s \eta (ExH) \cdot ds \qquad 10$$

where k=constant, $E=E_s+E_{lo}$, and $H_s+H_{lo}$ (signal+local oscillator 14). Assuming that the signal and local oscillator 14 fields are of the form:

$$E_s(x,y) = \rho(x,y) \cdot e^{i\omega t + i\phi(x,y)} \qquad 15$$

$$E_{lo}(x,y) = e^{i\omega' t + i\theta(x,y)} \qquad 20$$

$$\text{and } H = \frac{\epsilon}{\mu} \cdot E, \qquad 25$$

then the phase and magnitude of the intermediate frequency (I.F.) current output of detector 20, $I \propto \beta \cdot \cos(\Delta\omega + \alpha)$, can be shown to be given as:

$$I(\theta(x,y)) = \qquad 30$$

$$2 \cdot k \cdot \sqrt{\frac{\epsilon}{\mu}} \cdot \eta_{\mathit{eff}} \cdot Re\left[ e^{i\Delta\omega t}\left\{ \int\!\!\int_s E_s(x,y) \cdot e^{i\theta(x,y)}dxdy \right\} \right]$$

and $$I(\theta(x,y)) = 2 \cdot k \cdot \sqrt{\frac{\epsilon}{\mu}} \cdot \eta_{\mathit{eff}} \cdot \beta(\theta(x,y)) \cdot \cos(\Delta\omega t + \alpha(\theta(x,y))) \qquad 35$$

where $\Delta\omega = |\omega - \omega'|$ is the heterodyned intermediate frequency and $\eta_{\mathit{eff}}$ is the average effective quantum efficiency of detector 20. If the spatial phase functions, $\theta(x,y)$, of local oscillator 14 are chosen such that they form a complete basis set, and are orthonormal (though, normalization is not required) such that:

$$\int\int_S e^{i\theta(k_x,k_y,x,y)} \cdot e^{-i\theta(k'_x,k'_y,x,y)} dxdy = \delta(k_x - k'_x) \cdot \delta(k_y - k'_y) \quad 40$$

in which case the output of detector 20 can be written in terms of the basis set:

$$I(k_x,k_y) = 2 \cdot k \cdot \sqrt{\frac{\epsilon}{\mu}} \cdot \eta_{eff} \cdot \quad 45$$

$$Re\left[e^{i\Delta\omega t}\left\{\int\int_S E_s(x,y) \cdot e^{i\theta(k_x,k_y,x,y)} dxdy\right\}\right]$$

$$= 2 \cdot k \cdot \sqrt{\frac{\epsilon}{\mu}} \cdot \eta_{eff} \cdot \beta(k_x,k_y) \cdot \cos(\Delta\omega t + \alpha(k_x,k_y)) \quad 50$$

allowing the following Fourier transform pair to be defined:

$$E'_s(k_x,k_y) = \int\int_S E_s(x,y) \cdot e^{i\theta(k_x,k_y,x,y)} dxdy \leftrightarrow E_s(x,y) = \quad 55$$

$$\int\int_S E'_s(k_x,k_y) \cdot e^{-i\theta(k_x,k_y,x,y)} dk_x dk_y$$

where $E'_s(k_x,k_y)=C\cdot\beta(k_x,k_y)\cdot e^{i\alpha(k_x,k_y)}$, and C is a constant.

A coherent field is directly imaged by heterodyning the field with spatially modulated reference local oscillator 14 where each spatial mode projects out a Fourier coefficient. If the set of spatial modes spans a valid basis set, the image is obtained by inverse transforming the Fourier coefficients.

It should be understood that any valid two-dimensional basis set could be used with the invention for the phase function. However, throughout this specification, the familiar Cartesian Fourier series/transform will be used:

$$E_{lo}(k_x,k_y,x,y)=e^{i\omega' t+i(2\pi k^{xx}+2\pi k^{yy})} \quad 60$$

which is valid over the surface dimensions of detector 20, $s=(-x_0/2, x_0/2, -y_0/2, y_0/2)$. Furthermore, if the image field signal is interrogated with a discrete set of reference local oscillator 14 fields, then Equations 45 through 55 can be represented by the following Fourier transform pair:

$$\Phi_{Image}(x,y) \to \sum_m\sum_n C_{m,n}\Phi_{m,n}(x,y) \quad 65$$

$$C_{m,n} \to I_{m,n} \propto \underbrace{\int\int \Phi_{Image}\Phi_{m,n} dxdy}_{Detector} \quad 70$$

where $\Phi(x,y)$ is the two dimensional image field, $\Phi_{m,n}$ the discrete reference basis set (local oscillator 14 field), and $I_{m,n}$ the I.F. current from detector 20, whose magnitude and phase generates a Fourier coefficient, $C_{m,n}$, from the Fourier projection of $\Phi_{m,n}$ onto $\Phi_{Image}$ for each $\Phi_{m,n}$(Equation 70). The image field of Equation 70 can then be reconstructed from the basis functions, $\Phi_{m,n}$, and Fourier coefficients, $C_{m,n}$.

As has been shown, the present invention images both the magnitude and phase of the transverse field, while rejecting incoherent background. The imaging is performed on a single element detector 20, with a quantum limited detection signal-to-noise ratio being achievable. The invention has an applicable electromagnetic spectrum from radio frequencies through optical frequencies. It also can be used with many reference basis sets (the $\Phi_{m,n}$ of Equations 65–70), including, but not limited to, Cartesian, Zernike, cylindrical and other adaptive basis sets.

There are several important notes regarding the present invention. One is that Fourier transform heterodyne, according to the present invention, reduces to conventional heterodyning for the $k_x=k_y=0$ projection, i.e. conventional heterodyning only detects the "DC" term of the phase front. Another is that, in Cartesian Fourier space, (2–4)×M×N independent phase projections are required to generate a complex (including both phase and magnitude) image composed of M×N pixels and the quasi-coherent field should remain temporally "frozen" while the Fourier components are projected out. As a time scale reference, the atmosphere remains "frozen" over a period of 1–10 ms.

Figure 3:
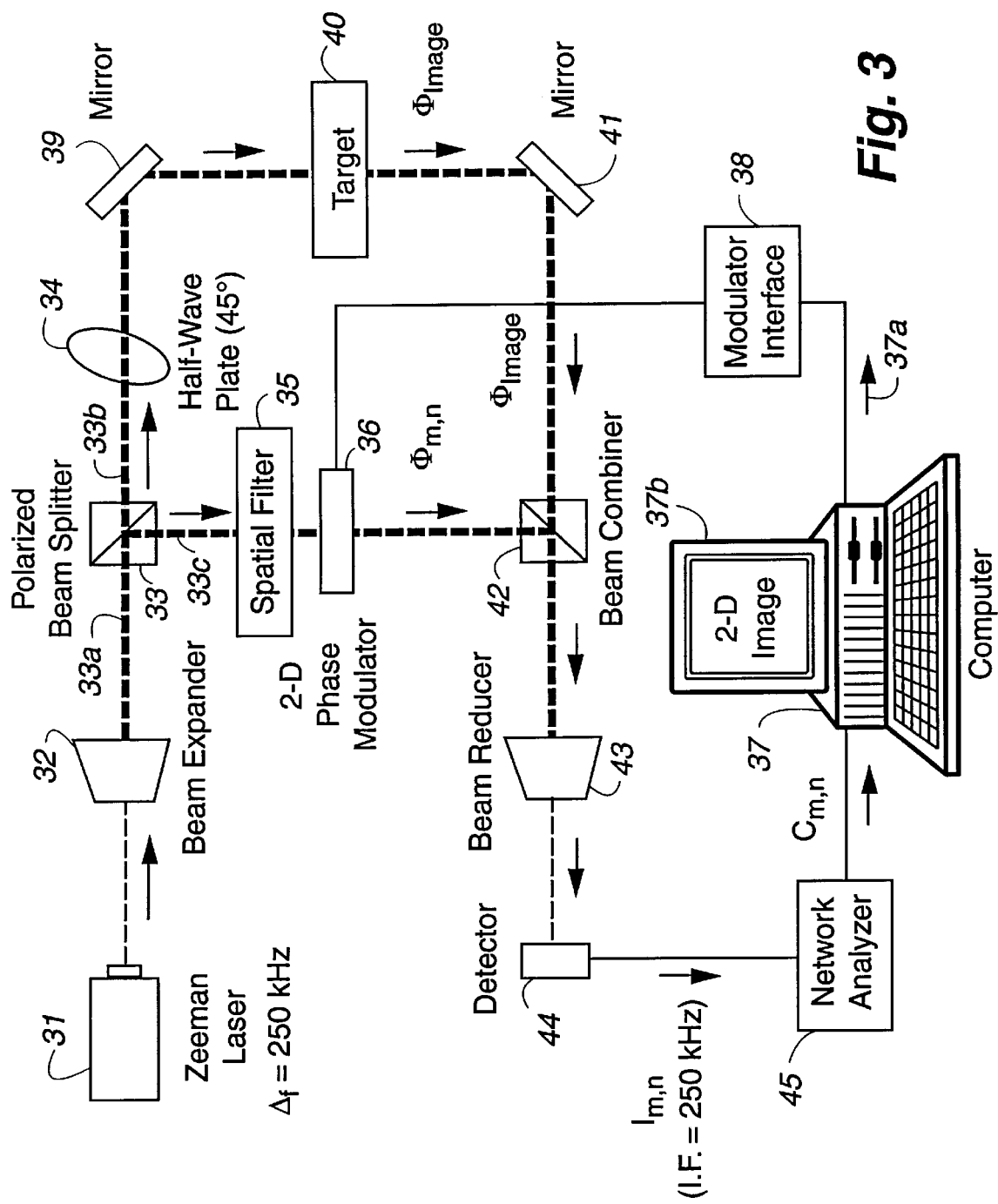
FIG. 3 is a schematical drawing of another embodiment of the present invention for imaging objects utilizing a two-dimension phase modulator for modulation.

One embodiment of a practical arrangement for practice of the present invention is illustrated in FIG. 3. Here, a Zeeman-split HeNe laser 31 outputs two laser lines separated by 250 kHz in frequency with one line horizontally polarized and the other vertically polarized to beam expander 32, and on to input 33a of polarized beam splitter 33. Polarized beam splitter 33 separates the horizontal line from the vertical line, and directs them onto two paths: the first from output 33b toward half-wave plate 34, rotating the polarization of the first laser line to match the polarization of the second laser line, and the second from output 33c toward spatial low pass filter 35, which serves to spatially filter the transverse phase and magnitude of the light. Light passing through spatial low pass filter 35 is directed to two-dimensional phase modulator 36.

Spatial low pass filter 35 is needed before two-dimensional phase modulator 36 because most coherent reference sources used with the present invention will contain transverse spatial phase and magnitude distortions that will degrade imaging quality. Spatial low pass filter 35 will filter the distortions improving image quality.

Two-dimensional phase modulator 36 is controlled by computer 37 through modulator interface 38. Modulator interface 38 converts the computer digital signals 37a to analog signals used by the phase modulator 36. The modulated light output from two-dimensional phase modulator 36 represents $\Phi_{m,n}$ (Equation 65).

The re-polarized light from half-wave plate 34, where its polarization is shifted by 90°, is transmitted to mirror 39. Mirror 39 simply redirects the light toward object 40. Light, having passed through object 40, now represents $\Phi_{Image}$ (Equation 65), and is redirected by mirror 41 to beam combiner 42. Beam combiner 42 combines the light representing $\Phi_{m,n}$ with the light representing $\Phi_{Image}$ and forwards the combination to beam reducer 43. The reduced combination light, $\Phi_{m,n}$ and $\Phi_{Image}$, is directed to detector 44, which outputs an I.F. current, $I_{m,n}$, whose magnitude and phase are proportional to the Fourier projection of $\Phi_{m,n}$ onto $\Phi_{Image}$. This I.F. current, $I_{m,n}$, is measured by network analyzer 45.

Network analyzer 45, after measuring the magnitude and phase of $I_{m,n}$, forms the Fourier coefficient, $C_{m,n}$, which are provided to computer 37. When all the $C_{m,n}$ coefficients have been measured, computer 37 performs the necessary inverse Fourier transform and creates a two-dimensional image which can be viewed on monitor 37b, or sent to a printer (not shown).

Most coherent sources used with the present invention will have a finite coherence length, $l_c$. This finite coherence length can degrade the images obtained with the present invention due to transverse amplitude and phase fluctuations on the order of the coherence time, $\tau_c$, intrinsic to a particular coherent source. This problem is solved in the present invention by removing the source fluctuations caused by coherence length through a common correlated reference.

This is accomplished through application of the following steps: first, measurement of the Fourier Coefficient, $C_{x\ i,j}$, of the transmitted coherent pulse for a given basis component, $\Phi_{i,j}$, within the coherence time, $\tau_c$, of the particular coherent source; second, measurement of the Fourier Coefficient, $C_{R\ i,j}$, of the received pulse after the transit time of flight, $\tau_t$; third, subtract the transverse amplitude and phase error of the coherent source as: $C_{i,j}\Phi_{i,j}=(C_{R\ i,j}-C_{X\ i,j})\Phi_{i,j}$ which simplifies to $C_{i,j}=C_{R\ i,j}-C_{X\ i,j}$. Note the transverse amplitude/phase of the reference field and two dimensional phase modulator, resulting in $\Phi_{i,j}$, is common to both $C_X$ and $C_R$, and must remain stable over the transit time, $\tau_t$. This process also is capable of tracking drifts in the reference field for variations which are slower than $\tau_t$.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for imaging an object from which a coherent electromagnetic field has been reflected comprising:

first mirror means for receiving and focusing said coherent electromagnetic field reflected from said object;

local oscillator means for producing a reference electromagnetic field;

spatial modulator means receiving said reference electromagnetic field for producing a modulated reference electromagnetic field;

second mirror means for reflecting said modulated reference electromagnetic field into said focused coherent electromagnetic field reflected from said object producing a summation of said modulated reference electromagnetic field and said focused coherent electromagnetic field;

detector means receiving said summed modulated reference electromagnetic field and focused coherent electromagnetic field for determining a heterodyne intermediate frequency defining a phase and magnitude and outputting said heterodyne intermediate frequency; and phase-locked detection means receiving said heterodyne intermediate frequency for locking and detecting said phase and magnitude of said heterodyne intermediate frequency and producing Fourier coefficients representing an image of said object to be imaged.

2. The apparatus as described in claim 1 wherein said referenced electromagnetic field is modulated by a programmable mirror.

3. Apparatus for imaging objects comprising: laser means for producing a coherent light beam; beamsplitting means receiving said coherent light beam for directing said coherent light beam onto a first path and onto a second path;

spatial low pass filter means located in said first path for spatially filtering coherent light for transverse phase and magnitude;

modulating means in said first path for spatially modulating said spatially filtered coherent light beam with an electrical signal;

an object to be imaged in said second path through which said coherent light beam passes;

beam combining means for combining said modulated coherent light from said first path with coherent light affected by said object from said second path;

detector means receiving said combined coherent light from said first and second paths, producing a spatial heterodyne, for outputting an electrical signal proportional to the spatial heterodyne of said combined coherent light;

analyzing means receiving said electrical signal for determining magnitude and phase of said electrical signal and outputting a signal proportional to said magnitude and phase of said electrical signal; and computer means receiving said signal proportional to said magnitude and phase of said electrical signal for performing an inverse Fourier transform on said signal and producing an image of said object.

4. The apparatus as described in claim 3, wherein said laser means comprises a Zeeman HeNe laser.

5. The apparatus as described in claim 3, wherein said modulating means comprises a 2-dimensional spatial phase modulator.

6. The apparatus as described in claim 3, further comprising beam reducing means for reducing said combined coherent light from said first and second paths prior to its arrival at said detector means.

7. The apparatus as described in claim 3, further comprising beam expander means for expanding said coherent light beam prior to its arrival at said beamsplittinq means.

8. The apparatus as described in claim 3, wherein said detector means comprises a single element detector.

9. The apparatus as described in claim 3, wherein said detector means comprises a plurality of detector elements.

10. A method of imaging an object comprises the steps of:

illuminating said object with an electromagnetic field;

collecting an electromagnetic field reflected from said object;

producing a reference electromagnetic field having a uniform transverse phase and magnitude;

modulating said transverse phase of said reference electromagnetic field with a Fourier basis set;

heterodyning said electromagnetic field reflected from said object with said modulated reference electromagnetic field producing a heterodyne intermediate frequency defining a phase and magnitude;

detecting said phase and magnitude of said heterodyne intermediate frequency and generating Fourier coefficients representing an image of said object.

11. The method as described in claim 10 further comprising the step of temporally frequency filtering said Fourier coefficients at a plurality of heterodyne intermediate frequencies to produce a Doppler image of said object.

12. The method as described in claim 10 further comprising the steps of:

measuring a predetermined Fourier coefficient component of said electromagnetic field before said electromagnetic field is reflected from said object;

measuring said predetermined Fourier coefficient of said electromagnetic field after said electromagnetic field is reflected from said object and received; and subtracting said measured predetermined Fourier component of said electromagnetic field before said electromagnetic field is reflected from said object from said measured predetermined Fourier component coefficient of said electromagnetic field after said electromagnetic field is reflected from said object and received.

* * * * *